United States Patent [11] 3,612,830

[72] Inventor Fritz Dienes
 Muehlheim am Main, Germany
[21] Appl. No. 11,651
[22] Filed Feb. 16, 1970
[45] Patented Oct. 12, 1971
[73] Assignee Dienes-Honeywell Holding GmbH
 Muehlheim am Main, Germany
[32] Priority Mar. 20, 1969
[33] Germany
[31] G 69 11 276

[54] HEATED ROLLER AND APPARATUS FOR SENSING ROLLER TEMPERATURE
10 Claims, 2 Drawing Figs.
[52] U.S. Cl. .................................................. 219/471,
 219/469
[51] Int. Cl. ...................................................... H05b 1/02

[50] Field of Search ........................................... 219/469,
 471

[56] References Cited
UNITED STATES PATENTS
3,273,101 9/1966 Burdge et al .................. 219/469
3,369,106 2/1968 Troll ............................. 219/471

Primary Examiner—Bernard A. Gilheany
Assistant Examiner—F. E. Bell
Attorneys—Lamont B. Koontz and Alfred N. Feldman ABSTRACT: A heated roller includes a cylindrical surface having an annular projecting edge near one end thereof. A stationary annular cover ring encloses a space including the one end of the roller surface and the projecting edge. A stationary temperature sensor is mounted to project into the space.

PATENTED OCT 12 1971 3,612,830

INVENTOR.
FRITZ DIENES
BY
Alfred N. Feldman
ATTORNEY.

HEATED ROLLER AND APPARATUS FOR SENSING ROLLER TEMPERATURE

BACKGROUND OF THE INVENTION

Heated rollers are used for heating and conveying synthetic material or filaments while the material is deformed, fixed or dried. It is necessary to measure the temperature of the outer surface of the roller around which the material is wound. A controller is then utilized to control the heat supply to maintain a desired temperature on the outer surface of the roller. In order to avoid inaccuracies which occur when sliprings are used, a stationary temperature-measuring element is used to measure the temperature of the roller. Such temperature-sensitive elements either have been mounted in the cylindric interior formed by the roller shell, i.e., on the stationary member that carries the roller-heating device, or an annular slot has been provided in the shell of the roller, concentric to the axis of rotation of the roller and next to the supporting frame and the stationary temperature-measuring element has been mounted on the frame to project into this slot.

SUMMARY OF THE INVENTION

This invention is directed to a heated-roller apparatus for sensing the temperature of the roller, the roller having a heating device arranged inside the shell of the roller and rigidly mounted on a supporting frame which supports the roller shaft. A stationary heat-sensitive measuring element is rigidly mounted on the supporting frame.

The apparatus of the present invention is constructed by arranging the temperature sensor at a short radial distance from a portion of the outer surface of the roller shell in such a manner that it faces this portion of the roller. This portion of the roller and the temperature sensor are covered by a fixed, stationary cover ring opposite the sensing element, and the side that lies opposite to the mounted portion of the sensor is covered by a circular projecting edge of the roller.

This structure produces reliable temperature measurement which is generally insensitive to outside influences and which, furthermore, has the advantage that it measures the temperature on the roller surface. A further advantage is that in the case of an inductive heated roller the temperature sensor does not project into the induction field and that, as would be the case if there were a circular slot, the cross-sectional area of the roller permeated by the inductive field is not reduced or partially interrupted in the area of the sensor.

In one form of the present invention, the cover ring is formed or a poor or low heat-conducting material, for instance a synthetic material or ceramic, and is provided with a mirrorlike, i.e., reflecting material, on the inner surface that faces the outer surface of the roller. This coating provides good heat distribution in the space between the outer surface of the roller and the cover ring. The cover ring and the projecting edge of the roller are shaped to protect against defects causes by threads that turn aside from their proper course over the roller and are twisted. In order to facilitate the heat transmission from the outer surface of the roller to the temperature sensor, the part of the roller that faces the sensor may be blackened.

DESCRIPTION OF THE PREFERRED EMBODIMENTS

Figure 1:
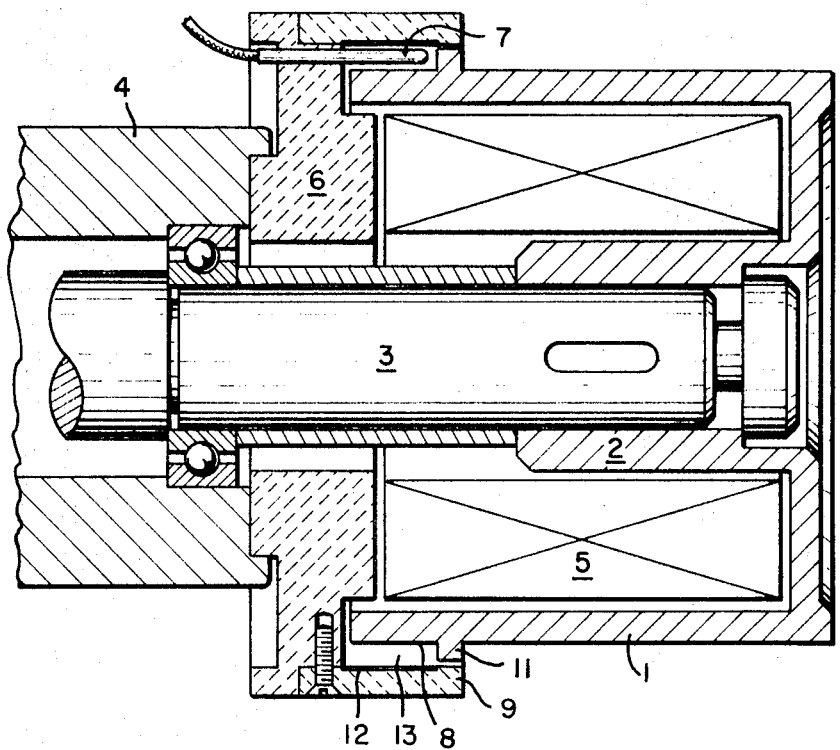
FIG. 1 discloses a first embodiment of the invention, and
FIG. 2 discloses a second embodiment of the invention having a different structure forming the cover ring.

Referring to FIG. 1, roller 1 has its hub 2 fixed to shaft 43 which is turnably supported in a stationary support frame 4 and is driven in appropriate manner, not shown. Stationary heating device 5 is surrounded by the roller shell. The heating of roller 1 can be effected in any convenient manner, for instance by means of electrical resistance heating, inductive heating, or the like. A centering flange 6, preferably of ceramic or another low heat-conducting material, is fixed to support frame 4 and supports temperature sensor 7. The latter is radially spaced opposite portion 8 of the roller surface.

Portion 8 of the roller, together with temperature sensor 7 is covered by an annular cover ring 9 which is formed of low heat-conducting material, for example, synthetic material or ceramic, and is provided with a mirrorlike surface 12 to prevent the heat from space 13 being absorbed by ring 9 and dissipated therefrom. Cover ring 9 is fixed to centering flange 6, but it also could be an integral part of the centering flange. That part of the space between roller 1 and the cover ring 9 that lies opposite to the portion of flange 6 to which sensor 7 is fixed and, therefore, opposite to support frame 4, is closed by annular projecting edge 11 of roller 1. Since projecting edge 11 is the same temperature as the shell of the roller, good heat transmission between the roller and the sensor is achieved. This heat transmission can be increased by blackening portion 8 of the roller and the surface of projecting edge 11 that lies next to sensor 7. The supporting connection between cover ring 9 and support frame 4 allows very little heat transmission. In addition to the inner surface of ring 9 being covered with a mirrorlike coating, the surface of centering flange 6 lying opposite projection edge 11 may also be covered with such a coating.

Figure 2:
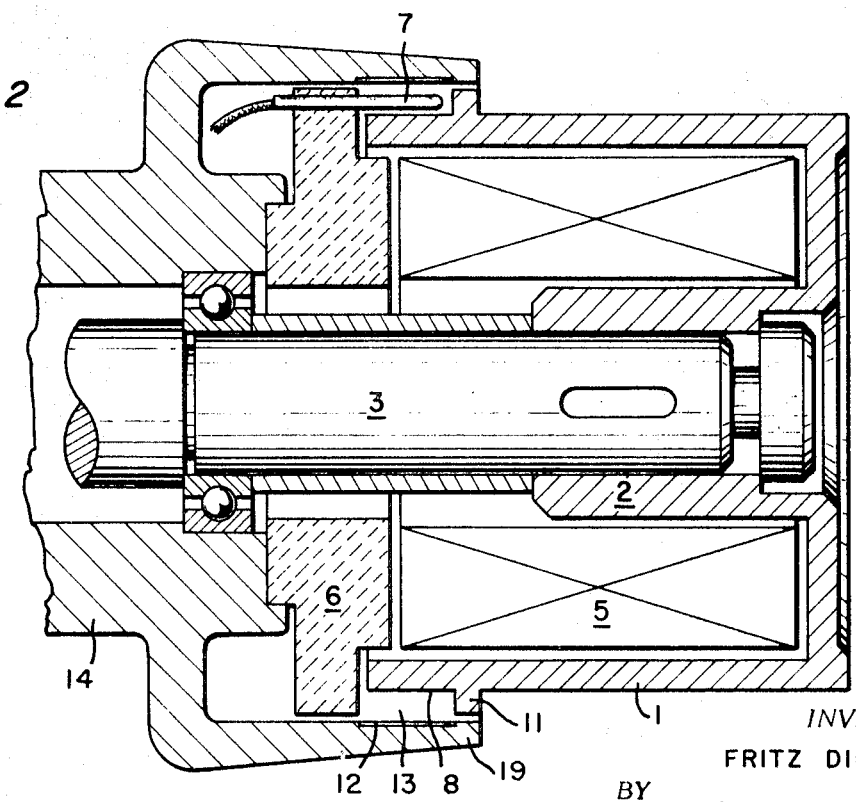

Referring to FIG. 2, only the means 14 and 19 which form cover ring 9 of FIG. 1 is changed. By means of the proper outer profile of projecting edge 11 and of cover ring 9, these parts serve as a means for holding off threads and prevent threads which run around roller 1 from entering in contact with sensor 7 to twist around and damage the sensor.

Cover ring 19, FIG. 2, is formed as a cuplike portion of support frame 14 to surround the end of roller 1 that faces the support frame. The remainder of the construction of FIG. 2 corresponds to that described with reference to FIG. 1. The structure of FIG. 2 is characterized by the fact that the electric connections to sensor 7 are covered and protected. Thus, no damage can be caused by a thread that turns aside from its course over roller 1 and is twisted. The protection achieved by this arrangement against the damage above mentioned is further improved by the fact that the diameter of ring 19 increases in the direction of support frame 14. A further advantage is that the space behind centering flange 6 is enclosed.

Several temperature sensors (not shown) can be provided to project into annular space 13 FIGS. 1 and 2 formed by portion 8, projecting edge 11, and by cover ring 9 or 19, respectively. One of these temperature sensors can, for example, be connected to a temperature controller, while the other can be connected to an indicating or recording device.

The embodiments of the invention in which an exclusive property or right is claimed are defined as follows:

1. In a heated roller and apparatus for sensing the temperature of the roller, having a heating device arranged inside the roller and a stationary temperature sensor, the improvement comprising;
    means mounting the temperature sensor a short radial distance from a portion of the outer surface of the roller,
    a stationary cover ring mounted to cover the sensor and said portion of the outer surface of the roller, and
    an annular projecting edge formed as a portion of the roller to form an annular space whose walls include said portion of the outer surface of the roller, said cover, and said projecting edge.
2. A roller and sensing apparatus as defined in claim 1, wherein said cover ring is formed of low heat-conducting material.
3. A roller and sensing apparatus as defined in claim 1, wherein said cover ring surrounds an end of the roller by means of an annular cuplike structure which extends along the roller to include said annular projecting edge.
4. A roller and sensing apparatus as defined in claim 3, wherein said cover ring includes a heat-reflecting layer on its inner surface.
5. A roller and sensing apparatus as defined in claim 4, wherein said heat-reflecting layer is a mirrorlike layer.

6. A roller and sensing apparatus as defined in claim 4, wherein said outer portion of the surface of the roller that faces the temperature sensor is covered by a heat-absorbing layer.

7. A roller and sensing apparatus as defined in claim 5, wherein said heat-absorbing layer consists of blackening said outer portion of the surface of the roller.

8. A roller and sensing apparatus as defined in claim 1, wherein said cover ring and said projecting edge of the roller are so shaped to prevent material handled by the roller from entering said annular space.

9. In combination,
- a cup-shaped roller adapted to be heated to provide a means for heating a fiber or the like which passes over said roller as said roller rotates,
- an annular projecting edge formed about the circumference of said roller, dividing said roller into a first surface which is adapted to engage the fiber or the like, and a second surface,
- a stationary temperature sensor radially spaced externally to and in close proximity to said second surface, and
- a stationary annular cover ring enclosing said second surface and said temperature sensor and extending an axial distance of said roller to cooperate with said projecting edge to form an enclosed space whose temperature is indicative of the temperature of the first surface of said roller.

10. The combination defined in claim 9, wherein the surfaces of said enclosed space which are stationary are provided with a heat-reflecting surface and the surfaces which rotate are provided with a heat-absorbing surface.